(12) United States Patent
Lee et al.

(10) Patent No.: US 9,625,780 B2
(45) Date of Patent: Apr. 18, 2017

(54) LIQUID CRYSTAL DISPLAY

(71) Applicant: Samsung Display Co., Ltd., Yongin, Gyeonggi-Do (KR)

(72) Inventors: Kang-Young Lee, Seongnam-si (KR); Hong Min Yoon, Seoul (KR); Ho Jun Lee, Cheonan-si (KR); Youn Hak Jeong, Cheonan-si (KR); Seung Ki Song, Seongnam-si (KR); Doo Hwan You, Seoul (KR); Sung-Jin Lee, Cheonan-si (KR); Kyung-Suk Jung, Cheonan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 20 days.

(21) Appl. No.: 14/562,305

(22) Filed: Dec. 5, 2014

(65) Prior Publication Data

US 2015/0168751 A1 Jun. 18, 2015

(30) Foreign Application Priority Data

Dec. 12, 2013 (KR) ........................ 10-2013-0154945

(51) Int. Cl.
*G02F 1/136* (2006.01)
*G02F 1/1362* (2006.01)
*G02F 1/1343* (2006.01)

(52) U.S. Cl.
CPC .... *G02F 1/136286* (2013.01); *G02F 1/13624* (2013.01); *G02F 1/136227* (2013.01); *G02F 1/134309* (2013.01); *G02F 1/136213* (2013.01); *G02F 2001/134345* (2013.01)

(58) Field of Classification Search
CPC ................. G02F 2001/134345; G02F 1/13624
See application file for complete search history.

(56) References Cited

U.S. PATENT DOCUMENTS

| | | | |
|---|---|---|---|
| 7,483,090 B2 | 1/2009 | Shin et al. | |
| 8,031,299 B2 | 10/2011 | Mori et al. | |
| 8,035,787 B2 | 10/2011 | Jung et al. | |
| 8,294,866 B2 | 10/2012 | Ki et al. | |
| 2011/0051065 A1* | 3/2011 | Seong ............... G02F 1/133711 349/123 |
| 2012/0154703 A1 | 6/2012 | Yoshida et al. | |
| 2012/0194774 A1 | 8/2012 | Jung et al. | |
| 2012/0223931 A1 | 9/2012 | Tashiro et al. | |

(Continued)

FOREIGN PATENT DOCUMENTS

| | | |
|---|---|---|
| JP | 2011-154101 A | 8/2011 |
| KR | 10-2014-0100126 A | 8/2014 |

*Primary Examiner* — Phu Vu
(74) *Attorney, Agent, or Firm* — Robert E. Bushnell, Esq.

(57) ABSTRACT

A liquid crystal display according to an exemplary embodiment of the present invention includes: a first substrate, a plurality of signal lines positioned on the first substrate, a pixel electrode connected to the signal lines, and a contact hole exposing a portion of the signal line, wherein the pixel electrode includes a cross-shaped stem, a plurality of branch electrodes extending from the cross-shaped stem, and an edge stem connecting the plurality of branch electrodes at an edge of the pixel electrode, and the edge stem of the pixel electrode adjacent to the contact hole being removed.

19 Claims, 9 Drawing Sheets

(56) References Cited

U.S. PATENT DOCUMENTS

2013/0342777 A1* 12/2013 Jeong ............... G02F 1/134336
          349/38
2014/0218655 A1   8/2014 Jeong et al.

* cited by examiner

LIQUID CRYSTAL DISPLAY

CLAIM OF PRIORITY

This application claims priority to and the benefit of Korean Patent Application No. 10-2013-0154945 filed in the Korean Intellectual Property Office on Dec. 12, 2013, the entire contents of which are incorporated herein by reference.

BACKGROUND OF THE INVENTION

Field of the Invention

The present invention relates to a liquid crystal display having improved viewing angle range.

Description of the Related Art

Liquid crystal displays (LCDs) are one of the most widely used flat panel displays, and an LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field within the LC layer that determines the orientations of LC molecules therein to adjust polarization of incident light.

Among these LCDs, a vertical alignment mode LCD, which arranges major axes of liquid crystal molecules so as to be perpendicular to the display panel in a state in which an electric field is not applied, has been widely used due to its high contrast ratio and wide reference viewing angle. Here, the reference viewing angle implies a viewing angle with a 1:10 contrast ratio, or a critical angle of gray-to-gray luminance reversion.

In order to approximate side visibility to front visibility in the vertical alignment mode LCD, a method of causing a difference in transmittance by dividing one pixel into two subpixels and applying different voltages to the two subpixels has been suggested.

On the other hand, an irregular arrangement of liquid crystal molecules is generated near a contact hole formed in an opening region in which the pixel electrode of the liquid crystal display is formed, and accordingly, display of the liquid crystal display is deteriorated.

The above information disclosed in this Background section is only for enhancement of understanding of the background of the invention and therefore it may contain information that does not constitute prior art under 35 U.S.C. §102, both prior to and after the America Invents Act (AIA).

SUMMARY OF THE INVENTION

The present invention prevents display quality deterioration due to irregular movement of liquid crystal molecules by preventing the irregular movement of the liquid crystal molecules generated near a contact hole formed in an opening region where a pixel electrode of a liquid crystal display is formed.

According to one aspect of the present invention, there is provided a liquid crystal display that includes a first substrate, a plurality of signal lines positioned on the first substrate, a pixel electrode connected to the signal lines and a contact hole exposing a portion of the signal line, the pixel electrode may include a cross-shaped stem, a plurality of branch electrodes extending diagonally from the cross-shaped stem, and an edge stem connecting the plurality of branch electrodes at an edge of the pixel electrode, and the edge stem of the pixel electrode adjacent to the contact hole may be removed.

The plurality of signal lines may include a gate line transmitting a gate signal, a data line transmitting a data signal and a first reference voltage line and a second reference voltage line transmitting a first reference voltage and a second reference voltage respectively having different polarities, wherein the contact hole may expose at least one of a portion of the first reference voltage line and a portion of the second reference voltage line. The display may also include a connecting member formed on the contact hole, the connecting member may include a plurality of edges extending in different directions, wherein adjacent edges may form obtuse angles with each other. Lengths of the edges of the connecting member may be almost the same.

The pixel electrode may includes a first subpixel electrode and a second subpixel electrode disposed in one pixel area, each pixel area also include a first switching element connected to the gate line, the data line, and the first subpixel electrode, a second switching element connected to the gate line, the data line, and the second subpixel electrode and a third switching element connected to the gate line, the first subpixel electrode, and one of the first reference voltage line and the second reference voltage line. A voltage of the one of the first reference voltage line and the second reference voltage line connected to the third switching element may have a same polarity as the common voltage. Polarities of the first reference voltage and the second reference voltage may change for each frame while having a predetermined magnitude.

The connecting member may include an electrically conductive material. The connecting member may electrically connects the gate line to the first reference voltage line through the contact hole. The display may include a plurality of pixels arranged in matrix form, wherein the pixel electrode of each pixel may include a first subpixel electrode and a second subpixel electrode, the second subpixel electrode may have a larger area than the first subpixel electrode.

The second subpixel electrode may encloses three out of four edges of the first subpixel electrode. The pixel electrode of each pixel includes a first subpixel electrode and a second subpixel electrode, the edge electrode may be present at all regions corresponding to a periphery of each of the first and second subpixels, except at locations corresponding to a contact hole. Each of the first and second subpixel electrodes may be quadrangular, wherein the contact hole may be arranged only at a corner of the quadrangle of one of the first and second subpixel electrodes. A different voltage may be applied to drive the first subpixel electrode than the second subpixel electrode at any point in time to provide differing tilt angles for liquid crystal molecules located within the first and second subpixels. The second subpixel electrode may be connected to a data line via a first switching element, and the first subpixel electrode may be voltage divided between the data line and a reference voltage line by second and third switching elements, the reference voltage line being may be held at a higher potential than the data line.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
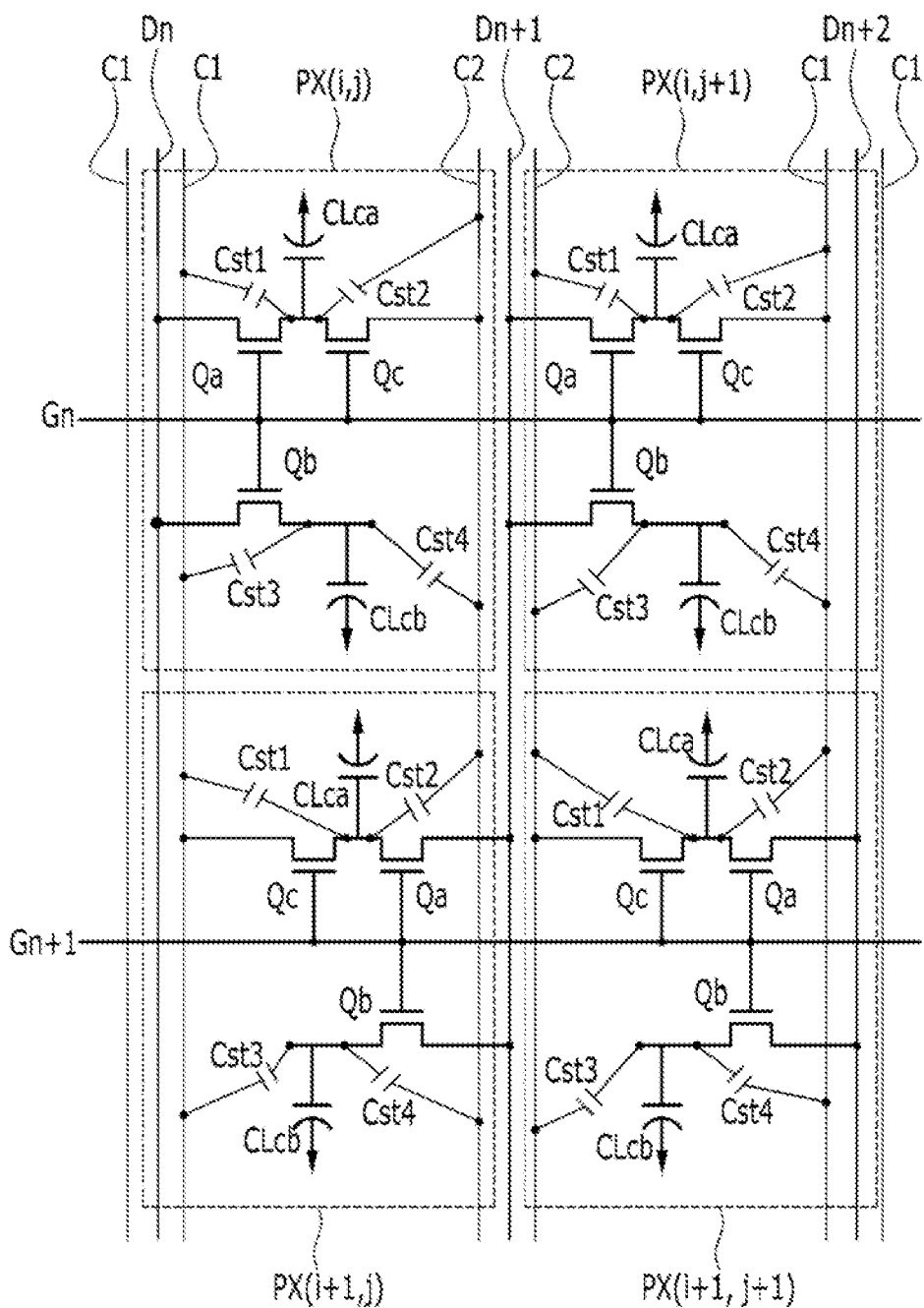
FIG. 1 is an equivalent circuit diagram of four pixels of a liquid crystal display according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, layouts of signal lines and pixels of a liquid crystal display according to a first exemplary embodiment of the present invention and a driving method thereof will be described with reference to FIG. 1. FIG. 1 is an equivalent circuit diagram of four pixels of a liquid crystal display according to a first exemplary embodiment of the present invention.

Referring to FIG. 1, a liquid crystal display according to the exemplary embodiment includes a first pixel PX(i, j) and a second pixel PX(i, j+1) which are adjacent to each other in a pixel row direction, a third pixel PX (i+1, j) and a fourth pixel PX(i+1, j+1) which are adjacent to the first pixel PX(i, j) and the second pixel PX(i, j+1) respectively in a pixel column direction, and a plurality of signal lines Gn, G(n+1), Dn, D(n+1), D(n+2), C1, and C2 which are connected thereto.

The signal lines Gn, G(n+1), Dn, D(n+1), D(n+2), C1, and C2 include a plurality of gate lines Gn and G(n+1) which transfer gate signals (referred to as scanning signals), a plurality of data lines Dn, D(n+1), and D(n+2) which transfer data voltages, and a plurality of pairs of reference voltage lines C1 and C2 which transfer predetermined reference voltages. The reference voltage lines C1 and C2 include a first reference voltage line C1 and a second reference voltage line C2 which transfer reference voltages having different polarities. First reference voltage and second reference voltage which have a predetermined magnitude are applied to the first reference voltage line C1 and the second reference voltage line C2, and polarities (with respect to a data voltage) of the first reference voltage and the second reference voltage are changed for each frame. For example, in the case where the magnitude of a common voltage is about 7.5 V, the first reference voltage may have a value of about 15 V or about 0 V for each frame, and on the contrary, the second reference voltage may have a value of about 0 V or about 15 V for each frame. The first reference voltage and the second reference voltage may be larger or smaller than a maximum value which is applied to the data voltage. Further, in the case where the first reference voltage and the second reference voltage have positive polarities based on the common voltage, a difference between the first and second reference voltages and the common voltage may be different from a difference between the first and second reference voltages and the common voltage in the case where the first reference voltage and the second reference voltage have negative polarities based on the common voltage.

The first pixel PX(i, j) includes a first gate line Gn, a first data line Dn, a first reference voltage line C1, a second reference voltage line C2, a first switching element Qa, a second switching element Qb, a third switching element Qc, a first liquid crystal capacitor CLca, and a second liquid crystal capacitor CLcb, and a first storage capacitor Cst1, a second storage capacitor Cst2, a third storage capacitor Cst3, and a fourth storage capacitor Cst4 which are connected thereto.

The first switching element Qa and the second switching element Qb are connected to each of the first gate line Gn and the first data line Dn, and the third switching element Qc is connected to the first gate line Gn, the second reference voltage line C2, and an output terminal of the first switching element Qa.

The first switching element Qa and the second switching element Qb are three-terminal elements such as a thin film transistor, of which a control terminal is connected to the first gate line Gn and an input terminal is connected to the first data line Dn. Further, the output terminal of the first switching element Qa is connected to the first liquid crystal capacitor CLca and an output terminal of the third switching element Qc, and the output terminal of the second switching element Qb is connected to the second liquid crystal capacitor CLcb.

The third switching element Qc is also a three-terminal element such as a thin film transistor, of which a control terminal is connected to the first gate line Gn, an input terminal is connected to the second reference voltage line C2, and an output terminal is connected with the first liquid crystal capacitor CLca.

The first storage capacitor Cst1 is connected between the output terminal of the first switching element Qa and the first reference voltage line C1, the second storage capacitor Cst2 is connected between the output terminal of the first switching element Qa and the second reference voltage line C2, the third storage capacitor Cst3 is connected between the output terminal of the second switching element Qb and the first reference voltage line C1, and the fourth storage capacitor Cst4 is connected between the output terminal of the second switching element Qb and the second reference voltage line C2.

The second pixel PX(i, j+1) includes the first gate line Gn, a second data line Dn+1, the first reference voltage line C1, the second reference voltage line C2, a first switching element Qa, a second switching element Qb, a third switching element Qc, a first liquid crystal capacitor CLca, and a second liquid crystal capacitor CLcb, and a first storage capacitor Cst1, a second storage capacitor Cst2, a third storage capacitor Cst3, and a fourth storage capacitor Cst4 which are connected thereto.

Control terminals of the first switching element Qa and the second switching element Qb of the second pixel PX(i, j+1) are each connected to the first gate line Gn, and input terminals thereof are each connected to the second data line D(n+1).

An output terminal of the first switching element Qa of the second pixel PX(i, j+1) is connected to the first liquid crystal capacitor CLca and the output terminal of the third switching element Qc, and an output terminal of the second switching element Qb of the second pixel PX(i, j+1) is connected to the second liquid crystal capacitor CLcb.

A control terminal of the third switching element Qc of the second pixel PX(i, j+1) is connected to the first gate line Gn, an input terminal is connected to the first reference voltage line C1, and an output terminal is connected with the first liquid crystal capacitor CLca.

The first storage capacitor Cst1 of the second pixel PX(i, j+1) is connected between the output terminal of the first switching element Qa and the second reference voltage line C2, the second storage capacitor Cst2 is connected between the output terminal of the first switching element Qa and the first reference voltage line C1, the third storage capacitor Cst3 is connected between the output terminal of the second switching element Qb and the second reference voltage line C2, and the fourth storage capacitor Cst4 is connected between the output terminal of the second switching element Qb and the first reference voltage line C1.

The third pixel PX (i+1, j) includes a second gate line G(n+1), the second data line D(n+1), the first reference voltage line C1, the second reference voltage line C2, a first switching element Qa, a second switching element Qb, a third switching element Qc, a first liquid crystal capacitor CLca, and a second liquid crystal capacitor CLcb, and a first storage capacitor Cst1, a second storage capacitor Cst2, a third storage capacitor Cst3, and a fourth storage capacitor Cst4, which are connected thereto.

Control terminals of the first switching element Qa and the second switching element Qb of the third pixel PX(i+1, j) are each connected to the second gate line G(n+1), and input terminals are each connected to the second data line D(n+1).

An output terminal of the first switching element Qa of the third pixel PX (i+1, j) is connected to both the first liquid crystal capacitor CLca and an output terminal of the third switching element Qc, and an output terminal of the second switching element Qb of the third pixel PX(i+1, j) is connected to the second liquid crystal capacitor CLcb.

A control terminal of the third switching element Qc of the third pixel PX(i+1, j) is connected to the second gate line G(n+1), an input terminal is connected to the first reference voltage line C1, and an output terminal is connected to the first liquid crystal capacitor CLca.

The first storage capacitor Cst1 of the third pixel PX(i+1, j) is connected between the output terminal of the first switching element Qa and the first reference voltage line C1, the second storage capacitor Cst2 is connected between the output terminal of the first switching element Qa and the second reference voltage line C2, the third storage capacitor Cst3 is connected between the output terminal of the second switching element Qb and the first reference voltage line C1, and the fourth storage capacitor Cst4 is connected between the output terminal of the second switching element Qb and the second reference voltage line C2.

The fourth pixel PX(i+1, j+1) includes the second gate line G(n+1), a third data line Dn+2, the first reference voltage line C1, the second reference voltage line C2, a first switching element Qa, a second switching element Qc, a third switching element Qc, a first liquid crystal capacitor CLca, and a second liquid crystal capacitor CLcb, and a first storage capacitor Cst1, a second storage capacitor Cst2, a third storage capacitor Cst3, and a fourth storage capacitor Cst4, which are connected thereto.

Control terminals of the first switching element Qa and the second switching element Qb of the fourth pixel PX(i+1, j+1) are each connected to the second gate line G(n+1), and input terminals are each connected to the third data line D(n+2).

An output terminal of the first switching element Qa of the fourth pixel PX(i+1, j+1) is connected to both the first liquid crystal capacitor CLca and an output terminal of the third switching element Qc, and an output terminal of the second switching element Qb of the fourth pixel PX(i+1, j+1) is connected to the second liquid crystal capacitor CLcb.

A control terminal of the third switching element Qc of the fourth pixel PX(i+1, j+1) is connected to the second gate line G(n+1), an input terminal is connected to the second reference voltage line C2, and an output terminal is connected to the first liquid crystal capacitor CLca.

The first storage capacitor Cst1 of the fourth pixel PX(i+1, j+1) is connected between the output terminal of the first switching element Qa and the second reference voltage line C2, the second storage capacitor Cst2 is connected between the output terminal of the first switching element Qa and the first reference voltage line C1, the third storage capacitor Cst3 is connected between the output terminal of the second switching element Qb and the second reference voltage line C2, and the fourth storage capacitor Cst4 is connected between the output terminal of the second switching element Qb and the first reference voltage line C1.

When a gate-on signal is applied to the first gate line Gn, the first switching elements Qa, the second switching elements Qb, and the third switching elements Qc of the first pixel PX(i, j) and the second pixel PX(i, j+1) are turned on. Accordingly, the data voltage applied to the first data line Dn is connected to one terminal of the first liquid crystal capacitor CLca and the second liquid crystal capacitor CLcb of the first pixel PX(i, j) through the turned-on first switching element Qa and second switching element Qb respectively of the first pixel PX(i, j), and the data voltage applied to the second data line D(n+1) is connected to one terminal of the first liquid crystal capacitor CLca and the second liquid crystal capacitor CLcb of the second pixel PX(i, j+1) through the turned-on first switching element Qa and second switching element Qb respectively of the second pixel PX(i, j+1). In this case, the first liquid crystal capacitor CLca and the second liquid crystal capacitor CLcb of the first pixel PX(i, j) are charged to the same voltage, and the first liquid crystal capacitor CLca and the second liquid crystal capacitor CLcb of the second pixel PX(i, j+1) are charged to the same voltage. Simultaneously, one terminal of the first liquid crystal capacitor CLca of the first pixel PX(i, j) is connected to the output terminal of the third switching element Qc to be boosted by a second reference voltage which is applied to the second reference voltage line C2 through the third switching element Qc. In this case, the second reference voltage applied to the second reference voltage line C2 has the same polarity as the data voltage applied to the first data line Dn, and a magnitude thereof may be larger than that of the data voltage applied to the first data line Dn. Accordingly, the voltage of the second reference voltage line C2 to which a relatively high voltage is applied through the third switching element Qc is divided and thus the voltage which is charged to the first liquid crystal capacitor CLca has a higher value than the data voltage applied through the first data line Dn.

Further, one terminal of the first liquid crystal capacitor CLca of the second pixel PX(i, j+1) is connected to the output terminal of the third switching element Qc to be boosted by the first reference voltage applied to the first reference voltage line C1 through the third switching element Qc. In this case, the first reference voltage applied to the first reference voltage line C1 has the same polarity as the data voltage applied to the second data line D(n+1), and may have a higher magnitude than the data voltage applied to the second data line D(n+1). Polarity means switching between two voltage levels, and does not necessarily infer positive or negative voltages. Accordingly, the voltage of the first reference voltage line C1 to which a relatively high voltage is applied through the third switching element Qc is divided and thus the voltage which is charged to the first liquid crystal capacitor CLca has a higher value than the data voltage.

When the gate voltage of the first gate line Gn is changed into a gate-off voltage and the gate voltage of the second gate line G(n+1) is changed into the gate-on voltage, the first switching elements Qa, the second switching elements Qb, and the third switching elements Qc of the third pixel PX(i+1, j) and the fourth pixel PX(i+1, j+1) are turned on. Accordingly, the data voltage applied to the second data line D(n+1) is applied to one terminal of each of the first liquid crystal capacitor CLca and the second liquid crystal capacitor CLcb of the third pixel PX(i+1, j) through the turned-on first switching element Qa and second switching element Qb respectively of the third pixel PX(i+1, j), and the data voltage applied to the third data line D(n+2) is applied to one terminal of each of the first liquid crystal capacitor CLca and the second liquid crystal capacitor CLcb of the fourth pixel PX(i+1, j+1) through the turned-on first switching element Qa and second switching element Qb respectively of the fourth pixel PX(i+1, j+1). In this case, the first liquid crystal capacitor CLca and the second liquid crystal capacitor CLcb of the third pixel PX(i+1, j) are charged to the same voltage, and the first liquid crystal capacitor CLca and the second liquid crystal capacitor CLcb of the fourth pixel PX(i+1, j+1) are charged to the same voltage. Simultaneously, one terminal of the first liquid crystal capacitor CLca of the third pixel PX(i+1, j) is connected to the output terminal of the third switching element Qc to be boosted by the first reference voltage which is applied to the first reference voltage line C1 through the third switching element Qc. In this case, the first reference voltage applied to the first reference voltage line C1 has the same polarity as the data voltage applied to the second data line D(n+1), and may have a higher magnitude than the data voltage applied to the second data line D(n+1). Accordingly, the voltage of the first reference voltage line C1 to which a relatively high voltage is applied through the third switching element Qc is divided, and thus a magnitude of the voltage which is charged to the first liquid crystal capacitor CLca has a higher value than the data voltage which is applied through the second data line D(n+1).

Further, one terminal of the first liquid crystal capacitor CLca of the fourth pixel PX(i+1, j+1) is connected to the output terminal of the third switching element Qc to be boosted by the second reference voltage which is applied to the second reference voltage line C2 through the third switching element Qc. In this case, the second reference voltage applied to the second reference voltage line C2 has the same polarity as the data voltage applied to the third data line D(n+2), and may also have a higher magnitude than the data voltage applied to the third data line D(n+2). Accordingly, the voltage of the second reference voltage line C2 to which a relatively high voltage is applied through the third switching element Qc is divided, and thus a magnitude of the voltage which is charged to the first liquid crystal capacitor CLca is larger than that of the data voltage.

The voltage charged in the first liquid crystal capacitor CLca and the voltage charged in the second liquid crystal capacitor CLcb are different from each other. Since the voltage charged in the first liquid crystal capacitor CLca and the voltage charged in the second liquid crystal capacitor CLcb are different from each other, inclined angles of liquid crystal molecules are different from each other in the first subpixel and the second subpixel, and thus luminances of the two subpixels are different from each other. Accordingly, by properly controlling the voltage charged in the first liquid crystal capacitor CLca and the voltage charged in the second liquid crystal capacitor CLcb, an image viewed from the side may be closest to an image viewed from the front, thereby improving side visibility.

Figure 2:
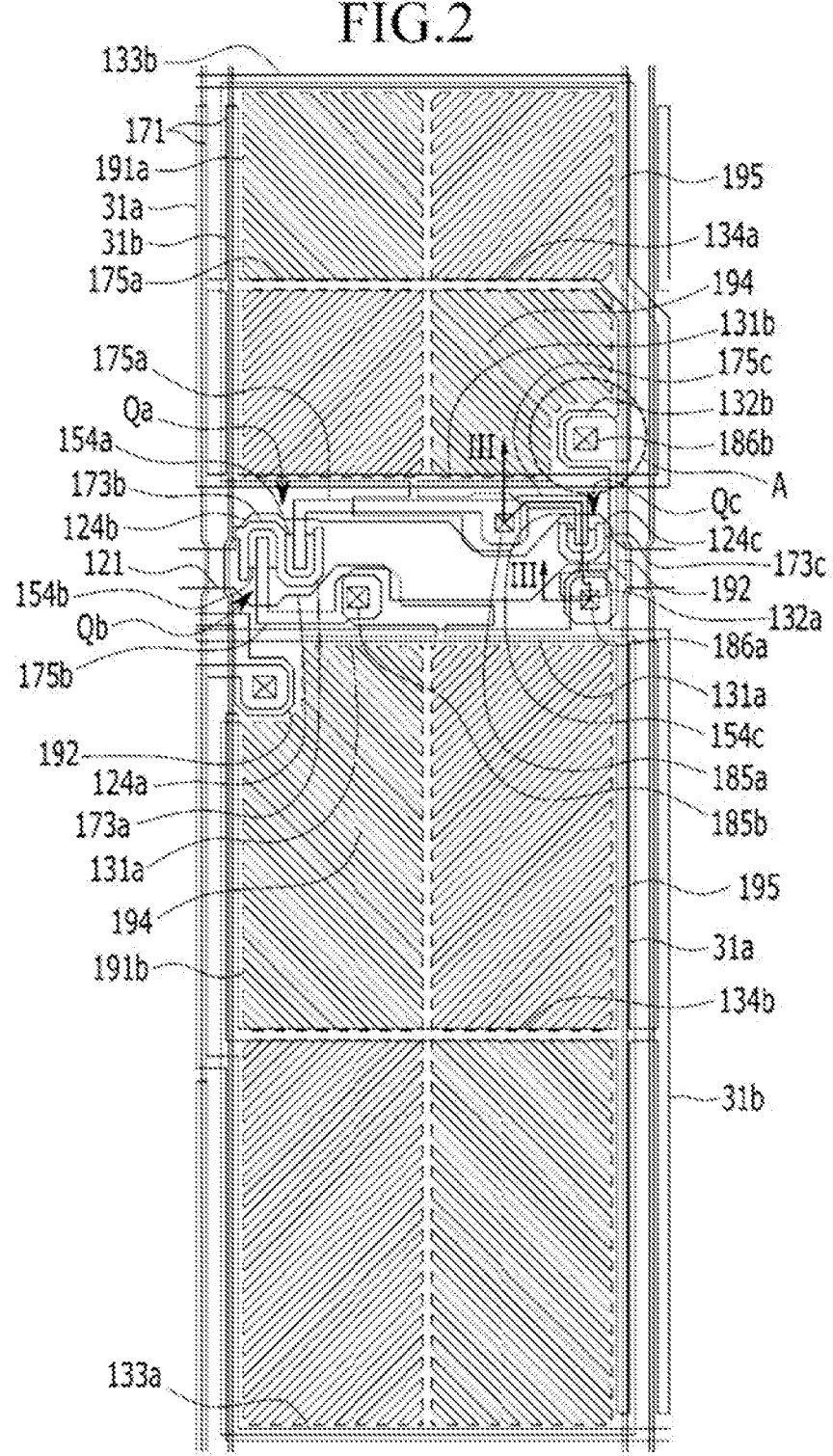
FIG. 2 is a layout view of the liquid crystal display according to the first exemplary embodiment of the present invention.

Now, one example of the liquid crystal display according to the exemplary embodiment shown in FIG. 1 will be described with reference to FIG. 2 and FIG. 3. FIG. 2 is a layout view of the liquid crystal display according to the first exemplary embodiment of the present invention, and FIG. 3 is a cross-sectional view of the liquid crystal display of FIG. 2 taken along line III-III.

Figure 3:
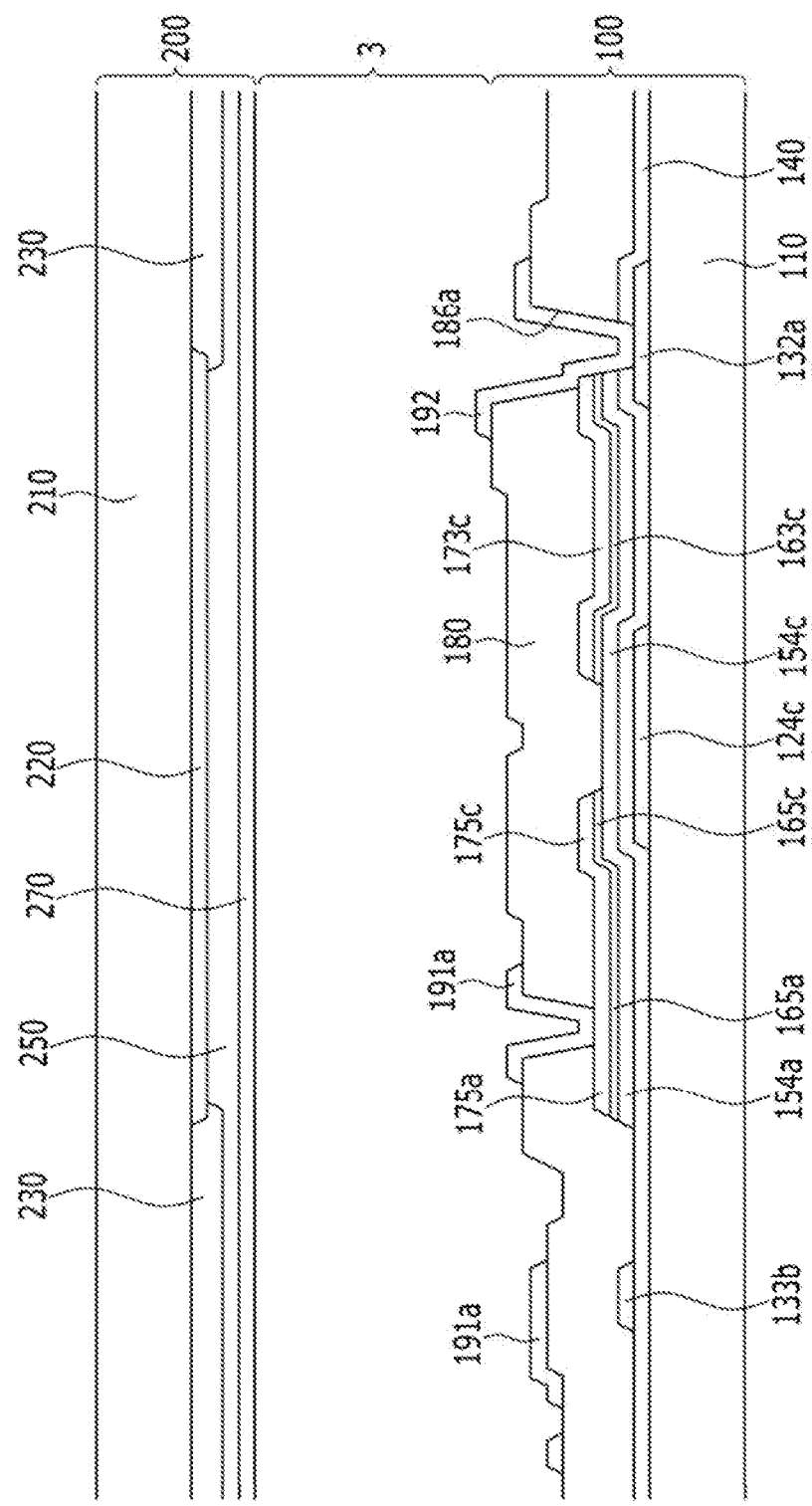
FIG. 3 is a cross-sectional view of the liquid crystal display of FIG. 2 taken along line III-III.

Referring to FIGS. 2 and 3, the liquid crystal display according to the first exemplary embodiment of the present invention includes a lower panel 100 and an upper panel 200 which face each other, and a liquid crystal layer 3 injected between the two panels 100 and 200. First, the lower panel 100 will be described.

A gate conductor including a plurality of gate lines 121 and a plurality of reference voltage lines 131a and 131b is disposed on a first insulation substrate 110. The gate line 121 transfers a gate signal, and includes a first gate electrode 124a, a second gate electrode 124b and a third gate electrode 124c.

The reference voltage lines 131a and 131b includes a first reference voltage line 131a transferring a first reference voltage and a second reference voltage line 131b transferring a second reference voltage. The first reference voltage line 131a and the second reference voltage line 131b are positioned on opposite sides of a data line 171, and include longitudinal portions 31a and 31b extending in parallel with the data line 171. The longitudinal portions 31a and 31b are connected to each other by a transverse portion that is described later.

The first reference voltage line 131a and the second reference voltage line 131b include as first transverse portion 133a and a second transverse portion 133b, and a third transverse portion 134a and a fourth transverse portion 1341 extending parallel to the gate line along an edge and through a center of a first subpixel electrode 191a and a second subpixel electrode 191b. The first reference voltage line 131a has a first extension 132a, and the second reference voltage line 131b has a second extension 132b.

A gate insulating layer 140 is disposed on the gate line 121 and the reference voltage lines 131a and 131b. A first semiconductor 154a, a second semiconductor 154b, and a third semiconductor 154c are disposed on the gate insulating layer 140. Ohmic contacts 165a, 163c, and 165c are disposed on the first semiconductor 154a, the second semiconductor 154b, and the third semiconductor 154c. The semiconductors 154a, 154b, and 154c may include an oxide semiconductor, and in this case, the ohmic contacts may be omitted.

A data conductor including the data line 171 including a first source electrode 173a, a second source electrode 173b, a third source electrode 173c, a first drain electrode 175a, a second drain electrode 175b, and a third drain electrode 175c are formed on the ohmic contacts 165a, 163c, and 165c and on the gate insulating layer 140. The first drain electrode 175a and the third drain electrode 175c are connected to each other.

A passivation layer 180 is formed on the data conductors 171, 173a, 173b, 173c, 175a, 175b, and 175c. The passivation layer 180 may be made of an inorganic insulator or an organic insulator.

A first contact hole 185a which exposes a part of the first drain electrode 175a and a second contact hole 185b which exposes a part of the second drain electrode 175b are formed in the passivation layer 180. A third contact hole 186a which exposes the first extension 132a of the first reference voltage line 131a and a fourth contact hole 186b which exposes the second extension 132b of the second reference voltage line 131b are formed in the gate insulating layer 140 and the passivation layer 180.

The first subpixel electrode 191a, the second subpixel electrode 191b, and a connecting member 192 are formed on the passivation layer 180. The first subpixel electrode 191a is physically and electrically connected to the first drain electrode 175a through the first contact hole 185a, and the second subpixel electrode 191b is physically and electrically connected to the second drain electrode 175b through the second contact hole 185b.

The first subpixel electrode 191a and the second subpixel electrode 191b are separated from each other with the gate line 121 arranged therebetween, and are disposed at the upper and lower sides of the pixel area about the gate line 121 and are adjacent to each other in a column direction.

The whole shape of the first subpixel electrode 191a and the second subpixel electrode 191b is a quadrangle, and includes a cross-shaped stem, a plurality of branch electrodes 194 extending in four diagonal directions from the cross-shaped stem and an edge stem, the edge stem 195 being formed at an edge of the pixel area.

The plurality of branch electrodes 194 include a portion obliquely extending in a right-upper diagonal direction, a portion obliquely extending in a right-lower diagonal direction, a portion obliquely extending in a left-upper diagonal direction, and a portion obliquely extending in a left-lower diagonal direction. As described above, inclined directions of the liquid crystal molecules in each portion where the plurality of branch electrodes 194 extend in the different diagonal directions are different from each other. Accordingly, four domains where the inclination directions of the liquid crystal molecules are different are formed in the liquid crystal layer 3 for each subpixel. As described above, when the inclined directions of the liquid crystal molecules are varied, a reference viewing angle of the liquid crystal display increases.

The first subpixel electrode 191a and the second subpixel electrode 191b are divided into a plurality of sub-regions by a plurality of branch electrodes 194 extending in four diagonal directions. An area of the second subpixel electrode 191b may be larger than an area of the first subpixel electrode 191a.

The connecting member 192 connects the first extensions 132a of the first reference voltage line 131a, which are disposed at the upper and lower sides in a pixel column direction, with the gate line 121 therebetween, or connects the second extensions 132b of the second reference voltage lines 131b which are disposed at the adjacent pixel areas.

Also, the first transverse portion 133a, the second transverse portion 133b, the third transverse portion 134a and the fourth transverse portion 134b of the first reference voltage line 131a and the second reference voltage line 131b extend parallel to the gate line 121 along an edge and through centers of the first subpixel electrode 191a and the second subpixel electrode 191b, and overlap the cross-shaped stem of the first subpixel electrode 191a and the second subpixel electrode 191b.

The first gate electrode 124a, the first semiconductor 154a, the first source electrode 173a, and the first drain electrode 175a form a first switching element Qa, the second gate electrode 124b, the second semiconductor 154b, the second source electrode 173b, and the second drain electrode 175b form a second switching element Qb, and the third gate electrode 124c, the third semiconductor 154c, the third source electrode 173c, and the third drain electrode 175c form a third switching element Qc.

Now, the upper panel 200 will be described. A light blocking member 220 is positioned on a second insulation substrate 210. The light blocking member 220 is called a black matrix and blocks light leakage. A plurality of color filters 230 are disposed on the second insulation substrate 210 and the light blocking member 220. An overcoat layer 250 is disposed on the color filter 230. The overcoat layer 250 prevents the color filters 230 and the light blocking member 220 from being detached, and suppresses contamination of the liquid crystal layer 3 due to an organic material such as a solvent which is input from the color filter 230, to thereby prevent a defect such as an afterimage which may be caused during screen driving, however and the overcoat layer 250 may be omitted. A common electrode 270 is disposed on the overcoat layer 250.

In the liquid crystal display according to the shown exemplary embodiment, the light blocking member 220 and the color filters 230 are disposed on the upper panel 200, but the light blocking member 220 and the color filters 230 of the liquid crystal display according to another exemplary embodiment of the present invention may be disposed on the lower panel 100. In this case, the color filter 230 may be disposed instead of the passivation layer 180.

The first subpixel electrode 191a and the common electrode 270 form the first liquid crystal capacitor CLca together with the liquid crystal layer 3 therebetween, and the second subpixel electrode 191b and the common electrode 270 form the second liquid crystal capacitor CLcb together with the liquid crystal layer 3 therebetween.

The first subpixel electrode 191a is overlapped with the first reference voltage line 131a and the second reference voltage line 131b which are disposed at the left and right sides to form the first storage capacitor Cst1 and the second storage capacitor Cst2 and reinforce a voltage storage capacity of the first liquid crystal capacitor CLca. The second subpixel electrode 191b is overlapped with the first reference voltage line 131a and the second reference voltage line 131b which are disposed at the left and right sides to form the third storage capacitor Cst3 and the fourth storage capacitor Cst4 and reinforce a voltage storage capacity of the second liquid crystal capacitor CLcb.

An electric field is applied to the liquid crystal layer 3 by the voltages which are applied to the first subpixel electrode 191a and the second subpixel electrode 191b and the common voltage which is applied to the common electrode 270, and directions of the liquid crystal molecules of the liquid crystal layer 3 are determined according to the intensity of the electric field. As described above, luminance of light which passes through the liquid crystal layer 3 varies according to the directions of the liquid crystal molecules.

As described above, the first subpixel electrode 191a is overlapped with the first reference voltage line 131a and the second reference voltage line 131b which are disposed at the left and right sides to form the first storage capacitor Cst1 and the second storage capacitor Cst2 and to reinforce a voltage storage capacity of the first liquid crystal capacitor CLca. The second subpixel electrode 191b is overlapped with the first reference voltage line 131a and the second reference voltage line 131b which are disposed at the left and right sides to form the third storage capacitor Cst3 and the fourth storage capacitor Cst4 and reinforce a voltage storage capacity of the second liquid crystal capacitor CLcb.

Further, the first reference voltage and second reference voltage which have a predetermined magnitude are applied to the first reference voltage line 131a and the second reference voltage line 131b, and polarities of the first reference voltage and the second reference voltage are changed for each frame. For example, in the case where the magnitude of the common voltage is about 7.5 V, the first reference voltage may have a value of about 15 V or about 0 V for each frame, and on the contrary, the second reference voltage may have a value of about 0 V or about 15 V for each frame. The first reference voltage and the second reference voltage may be larger or smaller than a maximum value which is applied to the data voltage. Further, in the case where the first reference voltage and the second reference voltage have positive polarities based on the common voltage, a difference between the first reference voltage and second reference voltage and the common voltage may be different from a difference between the first reference voltage and second reference voltage and the common voltage in the case where the first reference voltage and the second reference voltage have negative polarities based on the common voltage.

However, since the subpixel electrodes 191a and 191b are overlapped with the first reference voltage line 131a and the second reference voltage line 131b to which the first reference voltage and second reference voltage having different polarities are applied to form the storage capacitor, although the polarities of the first reference voltage and the second reference voltage are changed for each frame, the pixel voltage is not changed. This will be described later.

Figure 4:
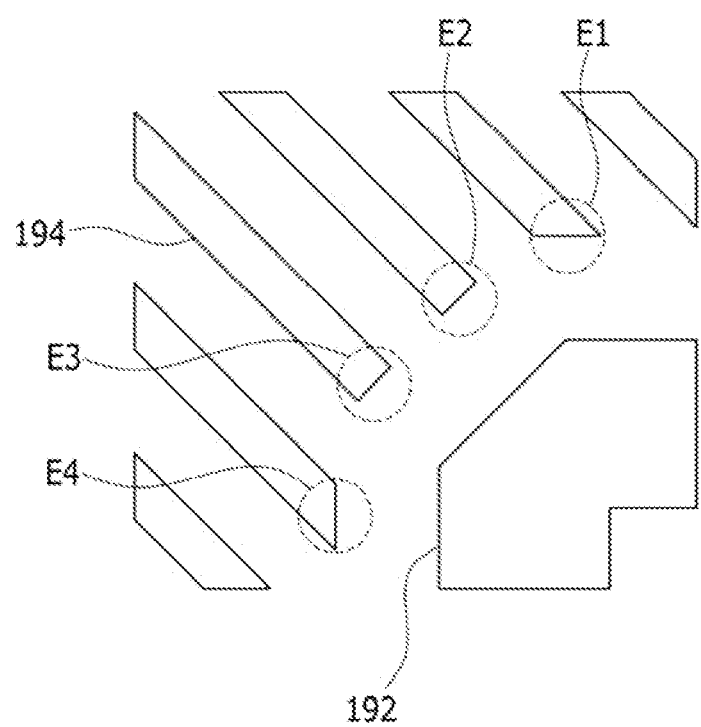
FIG. 4 and FIG. 5 are views schematically showing a portion of a liquid crystal display according to the first exemplary embodiment of the present invention.
Figure 5:
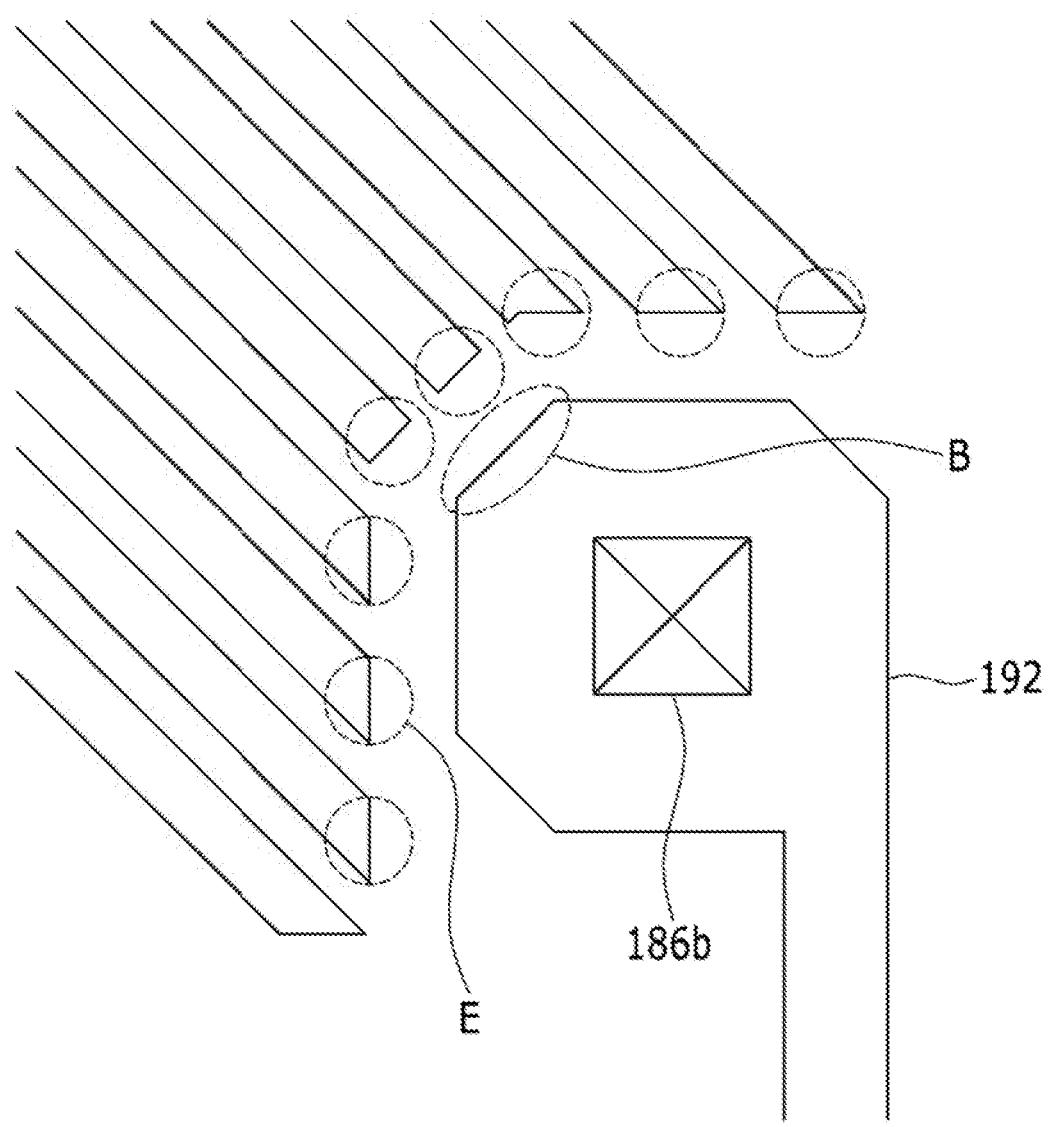

Next, a shape of a pixel electrode of a liquid crystal display according to the present exemplary embodiment will be described with reference to FIGS. 4 and 5. FIG. 4 and FIG. 5 are views schematically showing a portion A of FIG. 2 of a liquid crystal display according to an exemplary embodiment of the present invention.

Firstly, referring to FIG. 4, the pixel electrode 191 positioned to be adjacent to the connecting member 192 formed on the contact hole is removed with the edge stem 195 connecting end portions E of a plurality of branch electrodes 194.

In general, the liquid crystal molecules positioned near the contact hole are moved from the surroundings of the contact hole to the side of the contact hole as the height of the contact hole is decreased. Accordingly, irregular movement of the liquid crystal molecules may be easily generated near the contact hole.

As described above, the pixel electrode 191 of the liquid crystal display according to an exemplary embodiment of the present invention includes a plurality of branch electrodes 194. If the voltage is applied to the pixel electrode 191 and the common electrode 270 to generate the electric field to the liquid crystal layer 3, the sides of the plurality of branch electrodes 194 distort the electric field to make horizontal components of the electric field perpendicular to the sides of a plurality of branch electrodes 194 such that the inclination direction of liquid crystal molecules 31 is determined in the direction determined by the horizontal components of the electric field. Accordingly, the liquid crystal molecules 31 tend to be initially inclined in the direction perpendicular to the sides of a plurality of branch electrodes 194. However, the directions of the horizontal component of the electric field by the adjacent sides of a plurality of branch electrodes 194 are opposite to each other and the interval between a plurality of branch electrodes 194 is narrow, such that the liquid crystal molecules 31 that tend to be inclined in the opposite directions are inclined in the direction parallel to the length direction of a plurality of branch electrodes 194. Furthermore, the edge stem 195 of the pixel electrode 191 makes the horizontal component of the electric field perpendicular to the side of the edge stem 195. However, the length direction of a plurality of branch electrodes 194 of the pixel electrode 191 and the length direction of the edge stem 195 of the pixel electrode 191 are different, such that the movement of the liquid crystal molecules near the edge of the pixel electrode 191 may be irregular due to the edge stem 195 of the pixel electrode 191.

Particularly, the liquid crystal molecules positioned near the contact hole generates the irregular movement according to the height difference of the contact hole, and simultaneously the irregular movement is generated by the edge stem 195 of the pixel electrode 191.

However, according to the liquid crystal display according to an exemplary embodiment of the present invention, the edge stem 195 connecting the end portions E of a plurality of branch electrodes 194 of the pixel electrode 191 positioned near the contact hole is removed. Accordingly, the irregular movement of the liquid crystal molecules generated near the contact hole is reduced, such that the display quality deterioration depending on the irregular movement of the liquid crystal molecules may be prevented.

Referring to FIG. 5, the edge stem 195 connecting the end portions E of a plurality of branch electrodes 194 of the pixel electrode 191 positioned adjacent to the connecting member 192 formed on the third contact hole 186b is removed.

Also, the edges of the connecting member 192 have edge sides forming an obtuse angle with each other. The edges of the connecting member 192 make the horizontal component of the electric field in the direction perpendicular to the length direction that the edges extend. If the angle formed by the edges of the connecting member 192 is small, the liquid crystal molecules that are moved depending on the horizontal component of the electric field generated at the edge of the connecting member 192 may easily collide, and thereby the movement of the liquid crystal molecules may be irregular. However, according to the liquid crystal display of an exemplary embodiment of the present invention, the edges of the connecting member 192 have the edge sides forming obtuse angles with each other such that it is difficult for the liquid crystal molecules that are moved depending on the horizontal component of the electric field generated at the edge of the connecting member 192 to collide with each other.

As shown in FIG. 5, the lengths of the edges extending in the different directions and forming obtuse angles with each other among the edges of the connecting member 192 may be almost the same. That is, among the edges of the connecting member 192, the length of the edge extending in the direction almost parallel to the gate line or the data line and the length of the edge forming a predetermined angle with the gate line or the data line may be almost the same.

In this way, according to the liquid crystal display according to an exemplary embodiment of the present invention, the edge stem 195 connecting the end portions E of a plurality of branch electrodes 194 of the pixel electrode 191 positioned adjacent to the surroundings of the contact hole 186b is removed.

Accordingly, the irregular movement of the liquid crystal molecules generated near the contact hole is reduced, such that the display quality deterioration depending on the irregular movement of the liquid crystal molecules may be prevented.

Also, the connecting member 192 formed on the contact hole has the edges extending in the different directions and forming obtuse angles with each other, and the lengths of the edges extending in the different directions are formed to be the same. Accordingly, it is difficult for the liquid crystal molecules that are moved in the different directions depending on the horizontal component of the electric field generated at the edge of the connecting member 192 to collide with each other. Therefore, the irregular movement of the liquid crystal molecules generated near the connecting member formed on the contact hole may be prevented.

Figure 6:
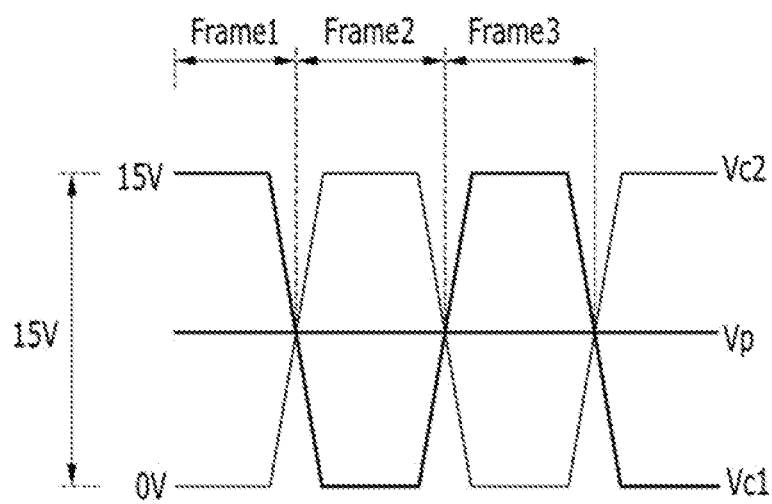
FIG. 6 is a waveform diagram for describing a voltage change of a pixel area depending on a voltage which is applied for each frame.

Next, a voltage applied to a liquid crystal display according to the present exemplary embodiment for each frame will be described with reference to FIG. 6. FIG. 6 is a waveform diagram for describing a voltage change of a pixel area according to a voltage which is applied for each frame.

Referring to FIG. 6, a first reference voltage Vc1 applied to the first reference voltage line 131a has a value of about 15 V for a first frame, has a value of about 0 V for a second frame, and has a value of about 15 V for a third frame. Further, a second reference voltage Vc2 applied to the second reference voltage line 131b has a value of about 0 V for a first frame, has a value of about 15 V for a second frame, and has a value of about 0 V for a third frame.

As described above, although the first reference voltage Vc1 and second reference voltage Vc2 having different polarities are changed for each frame, since the subpixel electrodes 191a and 191b are overlapped with the first reference voltage line 131a and the second reference voltage line 131b, changes in storage capacitance of the storage capacitors according to the polarity change of the first reference voltage Vc1 and the second reference voltage Vc2 are offset, and as a result, a magnitude of a voltage Vp, which is charged in each of the subpixel electrodes 191a and 191b, is not influenced and is uniformly maintained.

Figure 7:
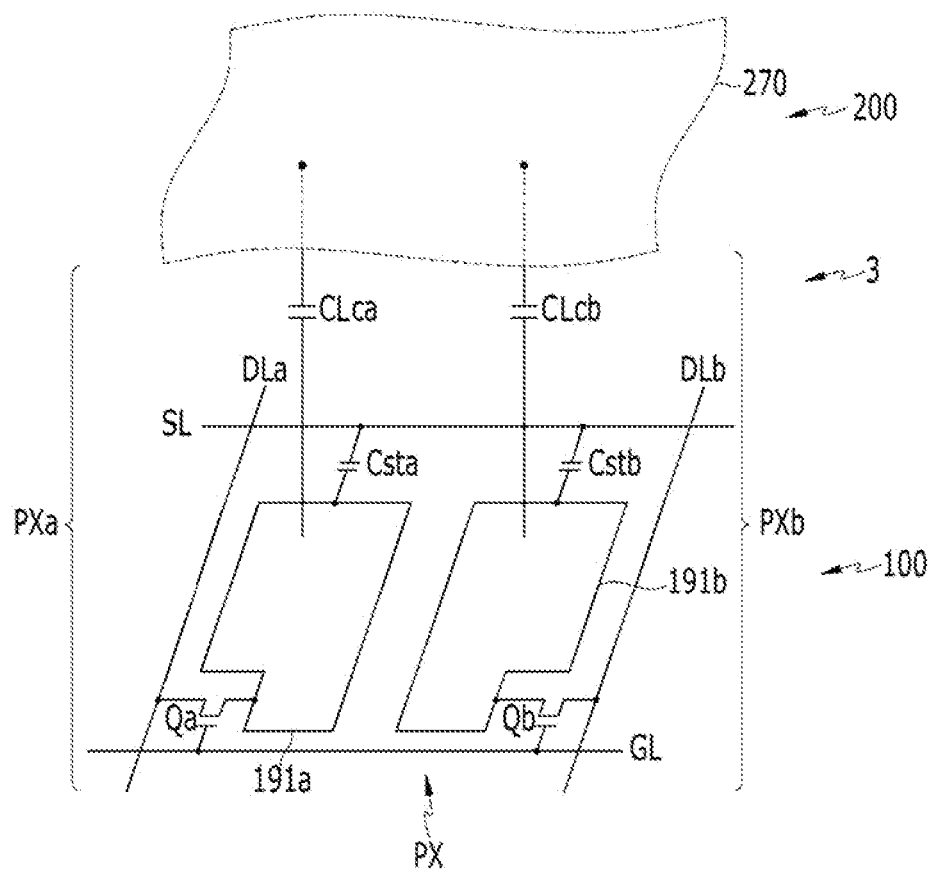
FIG. 7 is an equivalent circuit diagram of one pixel of a liquid crystal display according to a second exemplary embodiment of the present invention.
Figure 8:
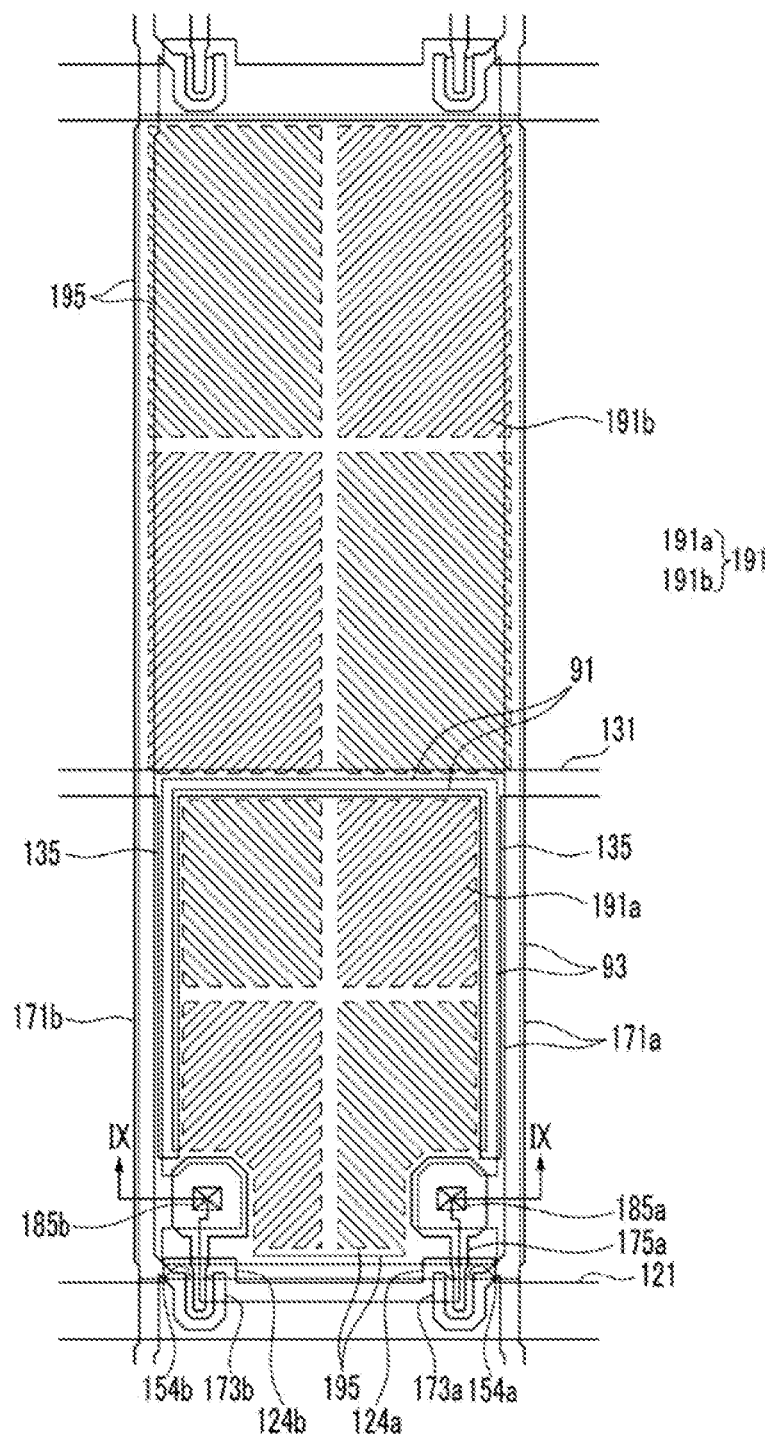
FIG. 8 is a layout view of the liquid crystal display according to the second exemplary embodiment of the present invention.
Figure 9:
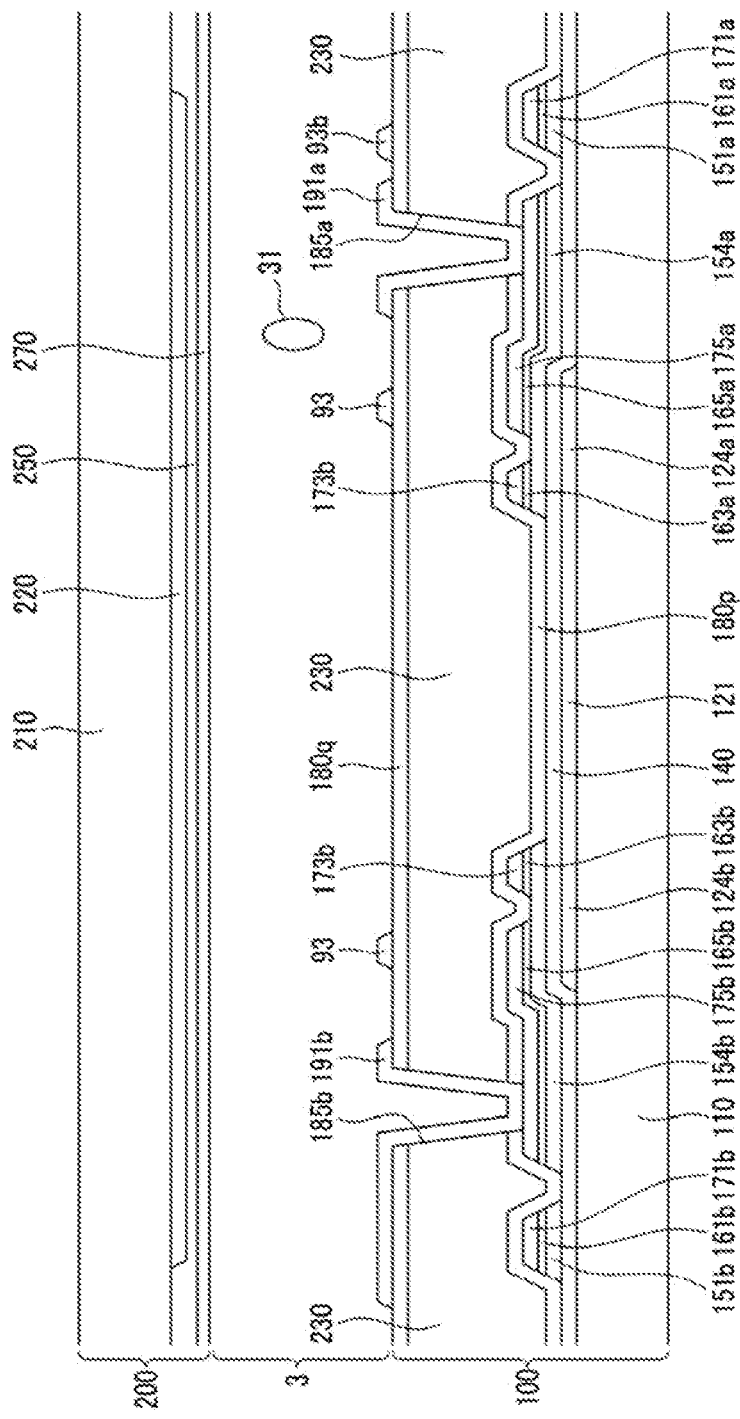
FIG. 9 is a cross-sectional view of the liquid crystal display of FIG. 8 taken along line IX-IX.

Next, a liquid crystal display according to a second exemplary embodiment of the present invention will be described with reference to FIGS. 7 to 9. FIG. 7 is an equivalent circuit diagram of one pixel of a liquid crystal display according to the second exemplary embodiment of the present invention, FIG. 8 is a layout view of the liquid crystal display according to the second exemplary embodiment of the present invention and FIG. 9 is a cross-sectional view of the liquid crystal display of FIG. 8 taken along line IX-IX.

Referring to FIG. 7, a liquid crystal display according to the second exemplary embodiment of the present invention includes signal lines having a plurality of gate lines GL, a plurality of pairs of data lines DLa and DLb, a plurality of storage electrode lines SL, and a plurality of pixels PX connected to the signal lines. The liquid crystal display includes a lower panel 100 and an upper panel 200 facing to each other, and a liquid crystal layer 3 interposed therebetween.

Each pixel PX has a pair of subpixels PXa and PXb. Each subpixel PXa/PXb has a switching element Qa/Qb, a liquid crystal capacitor CLca/CLcb, and a storage capacitor Csta/Cstb.

Each switching element Qa/Qb is a three-terminal element such as a thin film transistor provided on the lower panel 100, having a control terminal connected to the gate line GL, an input terminal connected to the data line DLa/DLb, and an output terminal connected to the liquid crystal capacitor CLca/CLcb and the storage capacitor Csta/Cstb.

The liquid crystal capacitor CLca/CLcb uses a subpixel electrode and a common electrode 270 as two terminals. The liquid crystal layer 3 between subpixel electrodes 191a/191b and 270 functions as a dielectric material.

The storage capacitor Csta/Cstb serving as an assistant to the liquid crystal capacitor CLca/CLcb is connected to a storage electrode line SL provided on the lower display panel 100, and the subpixel electrode 191a/191b overlap with an insulator interposed therebetween, and a predetermined voltage such as the common voltage Vcom is applied thereto.

It has been determined that a predetermined difference is generated between the voltages charged to the two liquid crystal capacitors CLca and CLcb. For example, the data voltage applied to the liquid crystal capacitor CLca is less or more than the data voltage applied to the liquid crystal capacitor CLcb. Therefore, when the voltages of the first and second liquid crystal capacitors CLca and CLcb are appropriately adjusted, it is possible to make an image viewed from the side be as similar as possible to an image viewed from the front, and as a result, it is possible to improve the side visibility.

Referring now to FIGS. 8 and 9, a liquid crystal display according to the second exemplary embodiment of the present invention includes the lower panel 100 and the upper panel 200 facing each other, and the liquid crystal layer 3 interposed between two display panels 100 and 200. Firstly, the lower panel 100 will be described.

A plurality of gate lines 121 and a plurality of storage electrode lines 131 are formed on a first insulating substrate 110. The gate lines 121 transmit gate signals and are extend substantially in the transverse direction. Each gate line 121 includes a plurality of first and second gate electrodes 124a and 124b protruding upward.

The storage electrode lines include a stem 131 extending substantially parallel to the gate lines 121, and a plurality of storage electrodes 135 extended from the stem. However, the shapes and arrangement of the storage electrode lines 131 may be modified in various forms.

A gate insulating layer 140 is formed on the gate lines 121 and the storage electrode lines 131. A plurality of first and second semiconductor stripes 151a and 151b made of amorphous silicon or crystalline silicon are formed on the gate insulating layer 140. Each of the semiconductor stripes 151a and 151b includes a plurality of projections 154a and 154b protruding toward the gate electrodes.

A plurality of pairs of ohmic contact members 161a, 161b, 163a, 163b, 165a, and 165b are formed on the semiconductor stripes 151a and 151b. The ohmic contacts 161a, 161b, 163a, 163b, 165a, and 165b may be made of n+ hydrogenated amorphous silicon in which a silicide or an n-type impurity is doped at a high concentration.

A plurality of data lines 171a and 171b and a plurality of first and second drain electrodes 175a and 175b are formed on the ohmic contact members 161a, 161b, 163a, 163b, 165a, and 165b and the gate insulating layer 140. The data lines 171 transmit data signals, and substantially extend in a vertical direction so as to cross the gate lines 121 and the stems 131 of the storage electrode lines. The data lines 171a and 171b include first and second source electrodes 173a and 173b bent in a U-shape by extending toward the first and second gate electrodes 124a and 124b, and the first and second source electrodes 175a and 175b that face the first and second source electrodes 173a and 173b with respect to the first and second gate electrodes 124a and 124b.

The drain electrodes 175a and 175b include one end portion extending upward, which is partially surrounded by the first source electrode 173a, and another end portion having a wide area so as to be connected to another layer. However, the shape and arrangement of the data lines 171a and 171b including the first and second drain electrodes 175a and 175b may be modified in various ways.

The first and second gate electrodes 124a and 124b, the first and second source electrodes 173a and 173b, and the first and second drain electrodes 175a and 175b, along with the projections 154a and 154b of the first and second semiconductor stripes 151a and 151b, form first and second TFTs Qa and Qb. Each of the first and second TFTs Qa and Qb has a channel formed in the projections 154a and 154b of the semiconductor stripes 151a and 151b disposed between the first and second source electrodes 173a and 173b and the first and second drain electrodes 175a and 175b, respectively.

The ohmic contacts 161a, 161b, 163a, 163b, 165a, and 165b are interposed between the projections 154a and 154b of the underlying semiconductor stripes 151a and 151b and the overlying data lines 171a and 171b and drain electrode 175a and 175b, and may reduce the contact resistance therebetween. The semiconductor stripes 151a and 151b include some exposed portions that are not covered by the data lines 171a and 171b and the drain electrodes 175a and 175b, such as portions located between the source electrodes 173a and 173b and the drain electrodes 175a and 175b.

The ohmic contact members 161a, 161b, 163a, 163b, 165a, and 165b, the data lines 171a, 171b, 173a, and 173b, and the drain electrodes 175a and 175b have the same planar pattern, and have substantially the same planar pattern as the semiconductor stripes 151a and 151b, except for exposed portions between the drain electrodes 175a and 175b and the source electrodes 173a and 173b.

A lower passivation film 180p made of silicon nitride or silicon oxide is formed on the data lines 171a and 171b, the drain electrodes 175a and 175b, and the exposed semiconductor stripes 151a and 151b. A color filter 230 is formed on the lower passivation film 180p. The lower passivation film 180p may prevent a pigment of the color filter 230 from flowing to the exposed portions of the semiconductor stripes 154a and 154b. However, the color filter 230 may be formed on the common electrode display panel 200.

An upper passivation film 180q is formed on the color filter 230. The upper passivation layer 180q may be made of an inorganic material. The upper passivation layer 180q prevents the color filter 230 from coming off and suppresses contamination of the liquid crystal layer 3 caused by an organic material, such as a solvent, flowing from the color filter 230, thereby preventing defects such as an afterimage that may be caused when the screen is driven.

A plurality of pixel electrodes 191 are formed on the upper passivation film 180q. Each of the pixel electrodes 191 includes first and second subpixel electrodes 191a and 191b separated from each other by a gap 91. An overall shape of the first and second subpixel electrodes 191a and 191b is a quadrangle, and they include a cross-shaped stem and an edge stem 195, a plurality of branch electrodes 194 extending from the cross-shaped stem and the edge stem 195 in four diagonal directions.

The plurality of branch electrodes 194 include a portion obliquely extending in a right-upper diagonal direction, a portion obliquely extending in a right-lower diagonal direction, a portion obliquely extending in a left-upper diagonal direction, and a portion obliquely extending in a left-lower diagonal direction. As described above, inclined directions of the liquid crystal molecules in each portion where the plurality of branch electrodes 194 extend in the different diagonal directions are different from each other. Accordingly, four domains where the inclination directions of the liquid crystal molecules are different are formed in the liquid crystal layer 3. As described above, when the inclined directions of the liquid crystal molecules are varied, a reference viewing angle of the liquid crystal display increases.

The plurality of branch electrode 194 makes an angle of about 45 or 135 degrees with the gate lines 121 or the horizontal stem portions. The branch electrodes in two adjacent sub-regions may extend perpendicular to each other.

The first subpixel electrode 191a and the second subpixel electrode 191b are divided into a plurality of sub-regions by the plurality of branch electrodes 194 extending in four diagonal directions. An area of the second subpixel electrode 191b may be larger than an area of the first subpixel electrode 191a. The second subpixel electrode 191b encloses the first subpixel electrode 191a. The second subpixel electrode 191b includes a connection 93 connected from the edge stem, enclosing three surfaces of the first subpixel electrode 191a, and having a quadrangular semi-annular shape.

The area occupied by the second subpixel electrode 191b may be 1.0 to 2.5 times larger than that of the first subpixel electrode 191a. However, the shape or area ratio of the first and second subpixel electrodes 191a and 191b may be modified in various ways.

The first and second subpixel electrodes 191a and 191b are physically and electrically connected to the first and second drain electrodes 175a and 175b via contact holes 185a and 185b formed in the first passivation layer 180p, and are applied with a data voltage from the first and second drain electrodes 175a and 175b.

Among the pixel electrode 191, the edge stem 195 of the pixel electrode 191 positioned to be adjacent to the contact holes 185a and 185b is removed. That is, in the portion adjacent to the contact holes 185a and 185b among the pixel electrode 191, the edge stem of the pixel electrode 191 connecting the ends of a plurality of branch electrodes 194 is removed. The liquid crystal molecules positioned near the contact hole are irregularly moved depending on the height difference of the contact hole, and simultaneously are irregularly moved by the edge stem 195 of the pixel electrode 191.

However, in the liquid crystal display according to an exemplary embodiment of the present invention, near the contact hole, the edge stem 195 connecting the ends of a plurality of branch electrodes 194 of the pixel electrode 191 is removed. Accordingly, the irregular movement of the liquid crystal molecules generated near the contact hole is reduced, thereby preventing the display quality deterioration due to the irregular movement of the liquid crystal molecules.

Next, the upper display panel 200 will be described. A light blocking member 220 is formed on a second insulating substrate 210 made of transparent glass or plastic. The light blocking member 220 is also called a black matrix, and blocks light leakage. The light blocking member 220 has a plurality of openings (not shown) that face the pixel electrodes 191, and have substantially the same shape as the pixel electrodes 191, and blocks light leakage between the pixel electrodes 191. However, the light blocking member 220 may consist of portions corresponding to the gate lines 121 and the data lines 171 and portions corresponding to the thin film transistors.

An overcoat 250 is formed on the light blocking member 220. The overcoat 250 is made of an organic insulator and provides a flat surface. The overcoat 250 may be omitted. A common electrode 270 is formed on the overcoat 250. The common electrode 270 is made of a transparent conductor such as indium tin oxide (ITO) or indium zinc oxide (IZO).

The liquid crystal layer 3 is interposed between the lower thin film transistor display panel and the upper common electrode display panel, and the liquid crystal layer 3 includes liquid crystal molecules 31 having negative dielectric anisotropy. The liquid crystal molecules 31 of the liquid crystal layer 3 may have a pretilt angle so that their long axes are substantially parallel to the lengthwise direction of the branch electrodes 194 of the first and second subpixel electrodes 191*a* and 191*b*, and they may be aligned so as to be perpendicular with respect to the surfaces of the two display panels 100 and 200. Also, at least one of the liquid crystal layer 3 and an alignment layer may include an optical polymerization material.

The first subpixel electrode 191*a* and the second subpixel electrode 191*b* are supplied with respective data voltages through different data lines 171*a* and 171*b*, and the voltage of the first subpixel electrode 191*a* having a relatively smaller area is higher than the voltage of the second subpixel electrode 191*b* having a relatively larger area. In this way, when the voltages of the first subpixel electrode 191*a* and second subpixel electrode 191*b* are different from each other, the voltages applied to the liquid crystal capacitors CLca and CLcb formed in the two pixel electrodes 191*a* and 191*b* are different from each other, so the tilt angles of the liquid crystal molecules 31 of each of the subpixels PXa and PXb are also different from each other. Therefore, the voltages supplied to these liquid crystal capacitors CLca and CLcb can be adjusted so that an image viewed from a lateral side is similar to an image viewed from the front, thereby improving lateral image viewing.

In accordance with the principles of the present invention, improved wide angle field viewing of an LCD display is achieved by eliminating irregular movements of liquid crystal molecules in a vicinity of a contact hole by 1) eliminating the occurrence of an edge stem 195 connecting together branches 194 of the pixel electrode adjacent to the contact hole, 2) forming a connecting member electrode 192 in a vicinity of the contact hole to have a plurality of edges have essentially equal lengths, and 3) having an angle between adjoining edges being obtuse. When each of these design choices are implemented into a LCD display, collisions and irregular movements of liquid crystal molecules is eliminated, thereby providing improved image quality.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a first substrate;
   a plurality of signal lines positioned on the first substrate;
   a pixel electrode connected to the signal lines; and
   a contact hole exposing a portion of the signal line,
   wherein the pixel electrode includes a cross-shaped stem, a plurality of branch electrodes extending diagonally from the cross-shaped stem, and an edge stem connecting the plurality of branch electrodes at an edge of the pixel electrode, wherein the edge stem of the pixel electrode adjacent to the contact hole is removed, wherein each of the branch electrodes includes a distal end opposite a proximal end, the proximal end of each branch electrode being attached to the cross-shaped stem, and ones of the branch electrodes spaced apart from the contact hole have the distal end attached to the edge stem, the edge stem being arranged at a periphery of the pixel electrode.

2. The liquid crystal display of claim 1, wherein the plurality of signal lines comprise:
   a gate line transmitting a gate signal;
   a data line transmitting a data signal; and
   a first reference voltage line and a second reference voltage line transmitting a first reference voltage and a second reference voltage respectively having different polarities,
   wherein the contact hole exposes at least one of a portion of the first reference voltage line and a portion of the second reference voltage line.

3. The liquid crystal display of claim 2, further comprising a connecting member formed on the contact hole and being spaced-apart everywhere from the pixel electrode, the connecting member includes a plurality of edges extending in different directions, wherein adjacent edges form obtuse angles with each other.

4. The liquid crystal display of claim 3, wherein lengths of the edges of the connecting member are almost the same.

5. The liquid crystal display of claim 4, wherein
   the pixel electrode includes a first subpixel electrode and a second subpixel electrode disposed in one pixel area, each pixel area further comprising:
   a first switching element connected to the gate line, the data line, and the first subpixel electrode;
   a second switching element connected to the gate line, the data line, and the second subpixel electrode; and
   a third switching element connected to the gate line, the first subpixel electrode, and one of the first reference voltage line and the second reference voltage line.

6. The liquid crystal display of claim 5, wherein a voltage of the one of the first reference voltage line and the second reference voltage line connected to the third switching element has a same polarity as the common voltage.

7. The liquid crystal display of claim 6, wherein the polarities of the first reference voltage and the second reference voltage are changed for each frame while having a predetermined magnitude.

8. The liquid crystal display of claim 1, wherein the plurality of signal lines comprise:
- a gate line transmitting a gate signal,
- a data line transmitting a data signal, and
- a first reference voltage line and a second reference voltage line transmitting a first reference voltage and a second reference voltage respectively having different polarities, the pixel electrode includes a first subpixel electrode and a second subpixel electrode disposed in each pixel; each pixel further comprising:
- a first switching element connected to the gate line, the data line, and the first subpixel electrode,
- a second switching element connected to the gate line, the data line, and the second subpixel electrode, and
- a third switching element connected to the gate line, the first subpixel electrode, and one of the first reference voltage line and the second reference voltage line.

9. The liquid crystal display of claim 8, wherein a voltage of the one of the first reference voltage line and the second reference voltage line connected to the third switching element has a same polarity as the common voltage.

10. The liquid crystal display of claim 9, wherein the polarities of the first reference voltage and the second reference voltage are changed for each frame while having a predetermined magnitude.

11. The liquid crystal display of claim 3, wherein the connecting member is comprised of an electrically conductive material.

12. The liquid crystal display of claim 11, wherein the connecting member electrically connects the gate line to the first reference voltage line through the contact hole.

13. The liquid crystal display of claim 1, wherein the display comprises a plurality of pixels arranged in matrix form, wherein the pixel electrode of each pixel includes a first subpixel electrode and a second subpixel electrode, the second subpixel electrode having a larger area than the first subpixel electrode.

14. The liquid crystal display of claim 13, wherein the second subpixel electrode encloses three out of four edges of the first subpixel electrode.

15. The liquid crystal display of claim 1, wherein the display comprises a plurality of pixels arranged in matrix form, wherein the pixel electrode of each pixel includes a first subpixel electrode and a second subpixel electrode, the edge stem being, present at all regions corresponding to a periphery of each of the first and second subpixels, except at locations corresponding to a contact hole.

16. The liquid crystal display of claim 15, wherein each of the first and second subpixel electrodes are quadrangular, wherein the contact hole is arranged only at a corner of the quadrangle of one of the first and second subpixel electrodes.

17. The liquid crystal display of claim 13, wherein a different voltage is applied to drive the first subpixel electrode than the second subpixel electrode at any point in time to provide differing tilt angles for liquid crystal molecules located within the first and second subpixels.

18. The liquid crystal display of claim 13, wherein the second subpixel electrode is connected to a data line via a first switching element, and the first subpixel electrode is voltage divided between the data line and a reference voltage line by second and third switching elements, the reference voltage line being held at a higher potential than the data line.

19. A liquid crystal display, comprising:
- a first substrate;
- a plurality of signal lines arranged on the first substrate;
- a first liquid crystal capacitor including a first sub-pixel electrode connected to the signal hues and a second liquid crystal capacitor including a second sub-pixel electrode connected to the signal lines; and
- a contact hole exposing a portion of the signal lines, wherein each of the first and second sub-pixel electrodes include:
- a cross-shaped stem,
- a plurality of branch electrodes having a proximal end attached to the cross-shaped stem, the branch electrodes extending diagonally from the cross-shaped stem, and
- an edge stem attached to distal and opposite ends of the plurality of branch electrodes, the edge stem being arranged at a periphery of each of the first and second sub-pixel electrodes, wherein the edge stem being absent in a vicinity of the contact hole.

* * * * *